(12) United States Patent
Gourves

(10) Patent No.: US 8,600,649 B2
(45) Date of Patent: Dec. 3, 2013

(54) METHOD FOR STARTING AN INTERNAL COMBUSTION ENGINE

(75) Inventor: Frédéric Gourves, Cergy le Haut (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1001 days.

(21) Appl. No.: 12/668,316

(22) PCT Filed: Jun. 26, 2008

(86) PCT No.: PCT/FR2008/051167
§ 371 (c)(1),
(2), (4) Date: Jan. 8, 2010

(87) PCT Pub. No.: WO2009/007605
PCT Pub. Date: Jan. 15, 2009

(65) Prior Publication Data
US 2010/0191447 A1    Jul. 29, 2010

(30) Foreign Application Priority Data

Jul. 9, 2007 (FR) ...................................... 07 56333

(51) Int. Cl.
*G06F 19/00* (2011.01)
*G06F 7/00* (2006.01)
*G06F 17/00* (2006.01)

(52) U.S. Cl.
USPC ... 701/113; 701/104; 123/179.3; 123/179.16; 123/436; 73/114.38

(58) Field of Classification Search
USPC ............... 701/113, 104, 115; 123/491, 179.3, 123/179.16, 436, 480, 486, 674; 73/114.38
See application file for complete search history.

(56) References Cited

U.S. PATENT DOCUMENTS

| 6,079,396 A * | 6/2000 | Ament et al. ............... 123/674 |
| 6,360,726 B1 * | 3/2002 | Javaherian ................. 123/491 |
| 6,679,225 B2 * | 1/2004 | Robertson et al. .......... 123/436 |
| 6,993,427 B2 * | 1/2006 | Ueda ........................ 701/111 |
| 7,163,002 B1 * | 1/2007 | Halverson et al. .......... 123/491 |
| 7,448,360 B2 * | 11/2008 | Kita ........................ 123/436 |
| 7,904,234 B2 * | 3/2011 | Ruggiano et al. .......... 701/113 |
| 8,141,542 B2 * | 3/2012 | Joly ........................ 123/491 |
| 2009/0107441 A1 * | 4/2009 | Husak et al. ............ 123/179.16 |

FOREIGN PATENT DOCUMENTS

| DE | 10217376 | 11/2003 |
| EP | 1517024 | 3/2005 |
| WO | WO2006109543 | 10/2006 |

OTHER PUBLICATIONS

International Search Report and Written Opinion for corresponding International Application No. PCT/FR2008/051167.

* cited by examiner

*Primary Examiner* — Mahmoud Gimie
*Assistant Examiner* — David Hamaoui
(74) *Attorney, Agent, or Firm* — Polster Lieder Woodruff & Lucchesi, L.C.

(57) ABSTRACT

The invention relates to a method for starting an internal combustion engine associated with means for adapting, during an engine start operation, an amount of fuel injected based on an estimation of the volatility (PVR) of the fuel based on the comparison between a gradient of the engine speed measured upon a preceding start operation and a reference gradient (110) corresponding to a predetermined fuel, characterized by the step (111) of correcting the reference gradient based on a change ($\Delta$CMF) in the engine friction torque.

11 Claims, 3 Drawing Sheets

METHOD FOR STARTING AN INTERNAL COMBUSTION ENGINE

CROSS-REFERENCE TO RELATED APPLICATIONS

The present application is the US national stage under 35 U.S.C. §371 of International Application No. PCT/FR2008/051167 which claims the priority of French application 0756333 filed on Jul. 9, 2007, the content of which (description, claims and drawings) is incorporated herein by reference.

BACKGROUND

The invention relates to a method for starting the internal combustion engine of an automobile. This method is particularly useful for cold start operations. In general, the goal of the invention is to reduce at the origin the polluting emissions of gasoline engines.

The quality of fuel used for vehicles varies greatly, especially as a function of the geographical zone where the vehicles operate. A particularly variable physical property of fuel is its vaporizing capacity, in other words its varying volatility. This capacity is well known in Anglo-Saxon literature under the acronym RVP (Raid Vapor Pressure). This acronym will be used in the following description of the invention. Fuels that vaporize easily are called HRVP (High RVP) and fuels that do not vaporize easily are called LRVP (Low RVP).

In order to start correctly, a gasoline engine requires a mixture of air and gasoline close to the stoichiometric mixture. This assumes proper control of the quantity of fuel under gaseous form. According to the volatility of the fuel, the quantity of fuel under gaseous form that participates in the combustion during cold start and when the engine is cranked can vary enormously for the same quantity of injected fuel.

In order to ensure a sufficient quantity of fuel under gaseous form for proper combustion during start and cranking of the engine, calibrations are made with a fuel that is representative of a fuel with relatively low volatility (LRVP). Then, tests are performed to ensure that when a more volatile fuel is used, type HRVP, the injected quantities are not excessive and there is no risk that excess gasoline in vapor form will hinder the combustion, due to the mixture becoming non-inflammable.

Therefore, the adjustment is the same regardless of the fuel. Consequently, when a relatively more volatile fuel is used, the quantity of fuel in vapor form is excessive during start and cranking of the engine. This excess does not participate in the combustion and is found in the exhaust of the engine in the form of unburned hydrocarbons (HC). This has a direct impact on the polluting emissions of the engine because even if the vehicle is equipped with a catalyst, the catalyst is not cold primed and the unburned hydrocarbons escape to the atmosphere.

During start in extreme cold, when the ambient temperature is below −15° C., the excess fuel in vapor form also creates black smoke at the exhaust.

BRIEF SUMMARY

Attempts were made to resolve this problem by adjusting the quantity of fuel injected in the engine cylinder during the start phase as a function of the vaporizing capacity of the fuel. Since it is difficult to measure this capacity directly in a vehicle, the vaporizing capacity of the fuel was estimated as a function of a speed gradient of the engine occurring after the first combustion in an engine cylinder. This gradient can be calibrated as a function of different types of fuel having different vaporizing capacities.

This method improves the adjustment of the fuel quantity injected in the engine during a start operation occurring after estimation of the vaporizing capacity of the fuel. Nevertheless, the obtained result is not very reliable in the light of other parameters that influence the performed measurement.

The goal of the invention is to improve the robustness of start performance, in particular cold start, by proposing to vary the calibration of a reference gradient as a function of the evolution of the internal friction torque of the engine.

To this end, the goal of the invention is a method for starting an internal combustion engine associated with means for adjusting, during the start operation of the engine, the quantity of injected fuel as a function of the estimated volatility of the fuel based on the comparison between the engine speed gradient measured during a preceding start operation and an reference gradient corresponding with a predefined fuel, characterized by a correction stage of the reference gradient as a function of the evolution of the friction torque of the engine.

Advantageously, the engine is associated with control means supervising its operation that use the evolution of the friction torque. In this way, the invention can be implemented without the need to add a supplementary sensor in the vehicle for measuring the evolution of the friction torque, because this information is already available at the engine control level.

Conventionally, the speed gradients can be determined starting from a first combustion occurring during the start operation.

Advantageously, the speed gradient correction is proportional to the ratio between the evolution of the friction torque and the inertia of the engine.

The speed gradients can be determined as the difference in engine speed between two successive combustions and the correction of the speed gradient proportional to the time separating the two successive combustions.

Advantageously, the reference gradient is a function of the engine temperature and the number of combustions that have taken place since the first combustion.

Several reference gradients can be defined for distinct values of the fuel vaporizing capacity. The quantity of fuel to be injected can be defined in linear or discrete manner as a function of the measured gradient value with respect to the reference values.

During the start operation, the gradient measured during one or more previous first start operations can be taken into account. For instance, the average can be made of several starts or an aberrant gradient measurement can be eliminated.

The present invention applies in particular to so-called "gasoline" engines, with spark ignition, and more in particular to engines likely to be supplied with different types of fuels, especially "gasoline" or alcohol based fuels (pure or in mixture with gasoline), in particular, FLEXFUEL type engines.

BRIEF DESCRIPTION OF THE DRAWINGS

The invention will be better understood and other advantages will come to light in the detailed description of an implementation mode, given as an example, illustrated by the attached drawing in which.

For clarity reasons, the same elements have the same references in the different figures.

DETAILED DESCRIPTION

Figure 1:
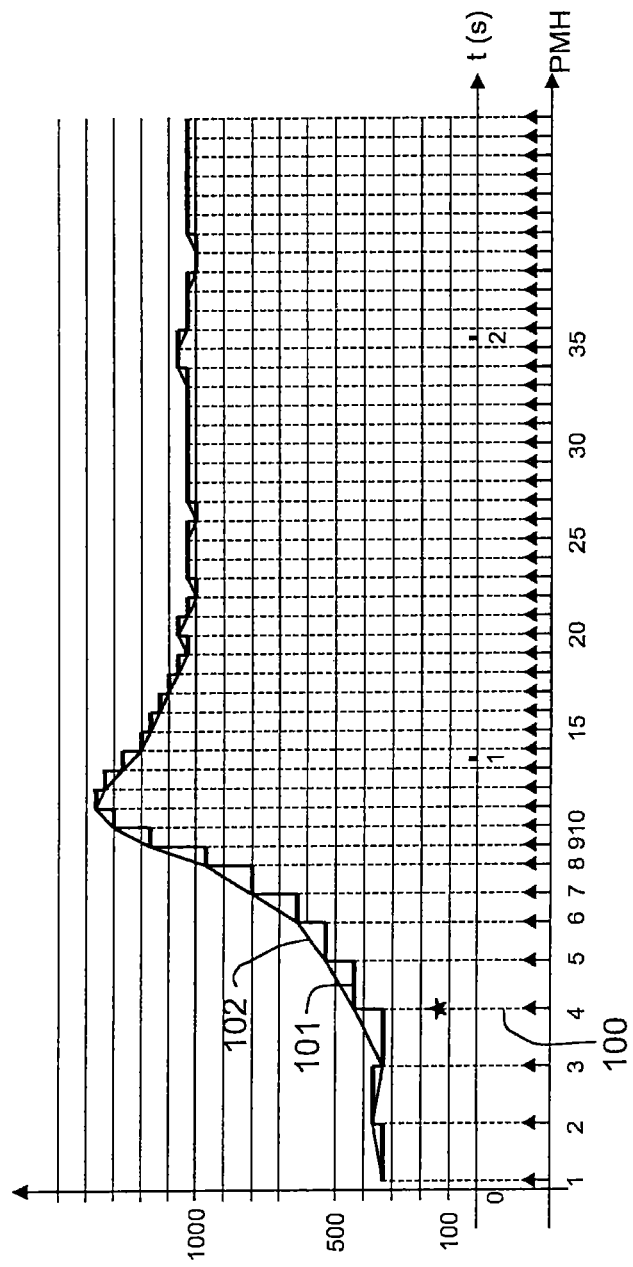
FIG. 1 shows an example of the evolution of engine speed during the start operation.

FIG. 1 shows in chronogram form an example of engine speed evolution during a start operation. The abscissa is graduated in seconds and PMH (upper dead point). This second graduation corresponds with points in time where combustions are likely to occur. These points are indicated by vertical arrows and continuing dotted lines. On the ordinate, the rotational speed of the engine is expressed in revolutions per minute.

At the time origin, 0 on the time axis, a start operation of the engine is initiated. Up to the fourth upper dead point, the vehicle starter cranks the engine at a speed between 300 and 400 revolutions per minute. At the fourth upper dead point, a first combustion 100 occurs in one engine cylinder. This first combustion is indicated in FIG. 1 by a star with five points. Beyond the fourth upper dead point, the engine speed increases until it reaches approximately 1400 revolutions per minute and then it decreases until it stabilizes at approximately 1000 revolutions per minute after the twentieth upper dead point. In practice, the engine speed is measured in each upper dead point, which is represented by a stair step curve 101 connecting the engine speed values in each upper dead point. Another, smoothened curve 102 connects directly the engine speed values measured in the different upper dead points.

Figure 2:
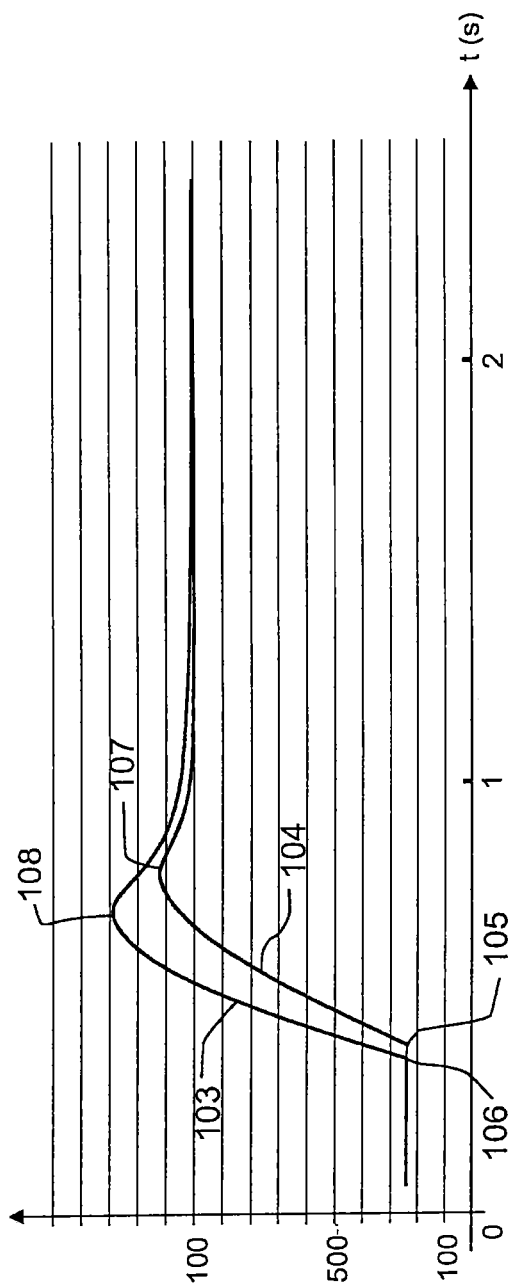
FIG. 2 shows an example of the measured engine speed evolution relative to a reference evolution.

FIG. 2 shows, with the same references as FIG. 1, a so-called reference evolution 103, similar to curve 102. Curve 103 is the ideal evolution for the engine. If a start operation follows evolution 103, the engine ejects the minimum possible amount of pollutants. Therefore, the fuel quantity injected in the engine cylinders during a start operation must be regulated so that it approaches as much as possible evolution 103.

On FIG. 2, another curve 104 represents the actual measured curve of a start operation. The first combustion 105 of evolution 104 occurs after the first combustion 106 of evolution 103. The maximum speed 107 reached by evolution 104 is around 1100 revolutions per minute. Speed 107 is lower than the maximum speed 108 reached by evolution 103. In addition, during the speed increase, after the first combustion, the gradient of evolution 104, or slope of evolution 104, is lower than the gradient of evolution 103.

It is known that this gradient is a function of the RVP of the used fuel. Furthermore, it was observed that this gradient depended also of the friction torque of the engine. By engine friction torque is understood all the resistance elements opposing the rotation of the engine without generating a speed. The friction torque is generated specifically inside the engine and through the transmission chain up to the clutch of the vehicle. These resistance elements are expressed in torque and are a function of different parameters such as engine speed.

The engine speed is easily determined by measurement and is taken into account in the reference evolution 103. The initial friction torque of the engine, in other words the existing friction of a new engine, is also taken into account in the reference evolution 103. On the other hand the friction torque is likely to evolve during the life of the engine. For instance, the friction torque evolves with engine wear and when the lubrication oil used in the engine is changed.

Consequently, for the same fuel (identical RVP), and while maintaining identical quantities of injected fuel, different engine speed evolutions can be measured during start operations. By maintaining a constant reference evolution, there is a risk of evolving the injected fuel quantities when the friction torque varies. This would result in the operation of the engine moving away from the stoichiometric ratio and the generation of pollution.

According to the invention, in order to improve the operation of the engine the reference evolution is corrected as a function of the variation of the engine friction torque.

Furthermore, modern vehicles are equipped with engine control means. These means implement, for instance, a torque feedback structure for the CME torque available at the crankshaft as a function of a command issued when the accelerator pedal of the vehicle is depressed by the driver of the vehicle. To this CME torque must be added the friction torque CMF of the engine and the distribution chain in order to obtain the CMI torque that must be supplied by the internal combustion of the engine.

The engine control means measure the evolution of the friction torque ΔCMF over the life of the engine. According to the invention, the information regarding the evolution of the friction torque ΔCMF is used for correcting the reference gradient.

In general, the torque is equal to the product of inertia and speed gradient. Applied to the idling engine, without driving the wheels, we have:

$$CMF = J_{mot} \cdot \frac{d\omega_{mot}}{dt} \quad (1)$$

$$\text{or: } \frac{d\omega_{mot}}{dt} = \frac{CMF}{J_{mot}} \quad (2)$$

equation in which $J_{mot}$ represents the inertia of the engine, $\omega_{mot}$ represents the rotational speed of the engine and t the time.

Introducing the evolution of the friction torque ΔCMF, equation (2) becomes:

$$\frac{d\omega_{mot\_ref\_corrected}}{dt} = -\frac{\Delta CMF}{J_{mot}} + \frac{d\omega_{mot\_ref}}{dt} \quad (3)$$

equation in which $$\frac{d\omega_{mot-ref}}{dt}$$

represents the reference gradient of the rotational speed of the engine and $$\frac{d\omega_{mot\_ref\_corrected}}{dt}$$

represents the corrected reference gradient of the rotational speed of the engine.

Equation (3) can be transformed in an equation with easy to measure engine parameters:

$$(N_n - N_{n-1})_{ref\_corrected} = -\frac{\Delta CMF}{J_{mot}} * \frac{30}{\pi} * T_{PMH} + (N_n - N_{n-1})_{ref} \quad (4)$$

In equation (4), the rotational speeds of the engine Ni are expressed in revolutions per minute at moments i in which combustions are likely to occur. $T_{PMH}$ expressed in seconds represents the time interval separating two previously described moments.

The factor $$\frac{30}{\pi}$$

ensures the homogeneity of the equation by converting radians per second in revolutions per minute.

Figure 3:
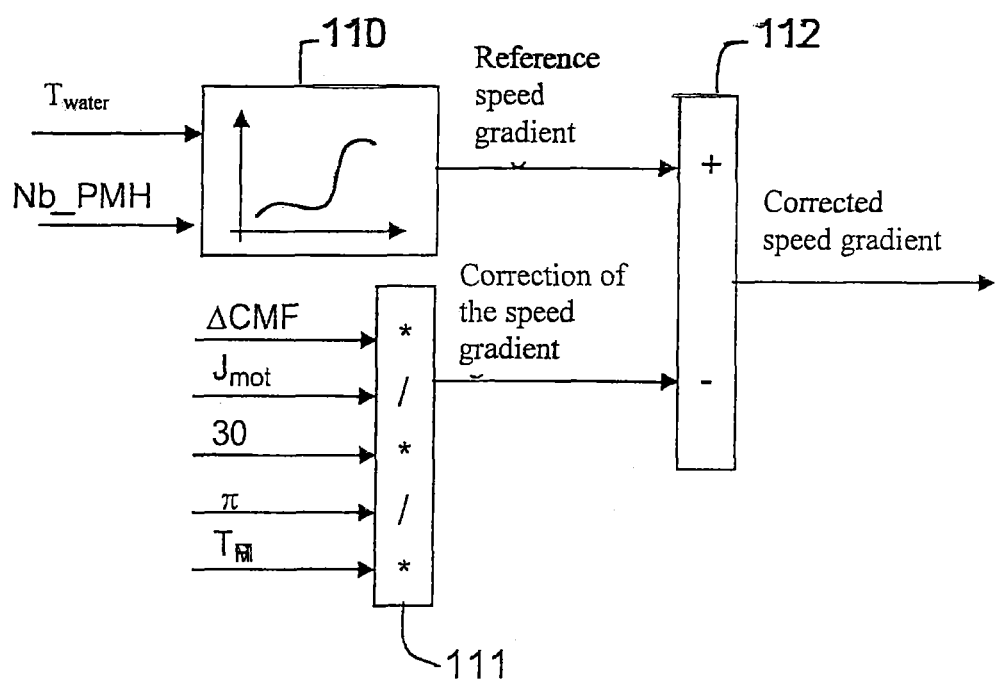
FIG. 3 shows schematically a correction made to the reference speed evolution as a function of the variation of the internal friction torque of the engine.

FIG. 3 represents equation (4) in schematic form. A box 110 represents a table defining the reference gradient ($N_n - N_{n-1}$)$_{ref}$. The value of the reference gradient is a function of the engine temperature, for instance the temperature of the cooling liquid, designated as input $T_{water}$ of box 110, and of the number of PMH's, designated Nb_PMH, elapsed since the first combustion.

The correction function $$\frac{\Delta CMF}{J_{mot}} * \frac{30}{\pi} * T_{PMH}$$

of the engine friction torque evolution is represented by box 111. The application of the correction to the reference gradient in order to obtain the corrected speed gradient is represented by box 112.

The measured gradient is then compared with the corrected speed gradient. The result of this comparison is a function of the RVP of the fuel used by the engine. Therefore, the quantity of fuel injected during the next start can be modified so that the measured gradient is as close as possible to the corrected gradient.

The invention claimed is:

1. A method for starting an internal combustion engine; the method comprising adjusting, during the start operation of the engine of a vehicle, the quantity of injected fuel as a function of the estimated volatility (RVP) of the fuel based on a comparison between an engine speed gradient measured during a preceding start operation and an engine speed reference gradient corresponding with a predefined fuel; and applying a correction to the reference gradient; the correction being a function of the evolution ($\Delta CMF$) of the engine friction torque.

2. The method according to claim 1 wherein the vehicle comprises an engine control means; the method further including measuring the evolution ($\Delta CMF$) of the friction torque for the needs of the engine control means.

3. The method according to claim 1 wherein the engine speed gradient is determined starting from a first combustion that occurred during the start operation.

4. The method according claim 1 wherein the correction of the engine speed gradient is proportional to a ratio between the evolution of the friction torque and the engine inertia.

5. The method according claim 4 wherein the engine speed gradient is determined as a difference in engine speed between two successive combustions; and the correction of the engine speed gradient is proportional to a time ($T_{PMH}$) separating the two successive combustions.

6. The method according to claim 1 wherein the engine speed reference gradient is a function of the engine temperature ($T_{water}$) and of the number (Nb_PMH) of combustions that occurred since the first combustion.

7. The method according to claim 1 wherein several engine speed reference gradients are defined for distinct values of the vaporizing capacity of the fuel and the quantity of fuel to be injected is defined in a linear manner as a function of the measured gradient value with respect to the reference values.

8. The method according to claim 1 wherein several engine speed reference gradients are defined for distinct values of the vaporizing capacity of the fuel and the quantity of fuel to be injected is defined in a discrete manner as a function of the measured gradient value with respect to the reference values.

9. The method according to claim 1 wherein during a start operation the engine speed gradient measured during one or several preceding first start operations is taken into account.

10. The method according to claim 1 implemented in an internal combustion engine with spark ignition.

11. The method according to claim 10, implemented in an internal combustion engine with FLEXFUEL type spark ignition.

* * * * *